United States Patent
D' Addetta et al.

(10) Patent No.: US 10,369,977 B2
(45) Date of Patent: Aug. 6, 2019

(54) METHOD FOR DETERMINING THE LEAN ANGLE OF A TWO-WHEELER

(71) Applicant: Robert Bosch GmbH, Stuttgart (DE)

(72) Inventors: Gian Antonio D' Addetta, Stuttgart (DE); Thomas Lich, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 15/543,754

(22) PCT Filed: Jan. 15, 2016

(86) PCT No.: PCT/EP2016/050810
§ 371 (c)(1),
(2) Date: Jul. 14, 2017

(87) PCT Pub. No.: WO2016/124375
PCT Pub. Date: Aug. 11, 2016

(65) Prior Publication Data
US 2018/0265059 A1     Sep. 20, 2018

(30) Foreign Application Priority Data
Feb. 6, 2015 (DE) .................. 10 2015 202 115

(51) Int. Cl.
*B60T 8/24* (2006.01)
*B60W 40/112* (2012.01)
(Continued)

(52) U.S. Cl.
CPC ............ *B60T 8/243* (2013.01); *B60T 8/1706* (2013.01); *B60T 8/241* (2013.01); *B60T 8/261* (2013.01); *B60W 10/184* (2013.01); *B60W 30/18145* (2013.01); *B60W 40/112* (2013.01); *B62K 11/00* (2013.01); *B60T 2230/03* (2013.01);
(Continued)

(58) Field of Classification Search
CPC ........ B60T 8/243; B60T 8/1706; B60T 8/241; B60T 8/261; B60T 2230/03; B60W 10/184; B60W 30/18145; B60W 40/112; B60W 2300/36; B60W 2422/80; B60W 2720/18;
(Continued)

(56) References Cited

U.S. PATENT DOCUMENTS 9,580,009 B1 *  2/2017  Lenker ................ B60Q 1/2603
2009/0022164 A1  1/2009  Oksman
(Continued)

FOREIGN PATENT DOCUMENTS

DE        10238526 A1      3/2004
DE     102008043794 A1     5/2010
(Continued)

OTHER PUBLICATIONS

"History and construction of the Motorcycle", Edinformatics website, publication date unknown, retrieved Dec. 11, 2018 at http://www.edinformatics.com/inventions_inventors/motorcycle.htm.*
(Continued)

*Primary Examiner* — Calvin Cheung
(74) *Attorney, Agent, or Firm* — Norton Rose Fulbright US LLP; Gerard Messina

(57) ABSTRACT

A method for determining the lean angle of a two-wheeler in which the axle load on at least one wheel is ascertained and the lean angle is calculated as a function of the axle load.

13 Claims, 2 Drawing Sheets

(51) Int. Cl.
    *B60T 8/17*        (2006.01)
    *B60T 8/26*        (2006.01)
    *B60W 10/184*      (2012.01)
    *B60W 30/18*       (2012.01)
    *B62K 11/00*       (2006.01)

(52) U.S. Cl.
    CPC ..... *B60W 2300/36* (2013.01); *B60W 2422/80* (2013.01); *B60W 2720/18* (2013.01); *B60Y 2200/12* (2013.01); *B60Y 2300/022* (2013.01); *B62K 2207/02* (2013.01)

(58) Field of Classification Search
    CPC ................ B62K 11/00; B62K 2207/02; B60Y 2200/12; B60Y 2300/022
    See application file for complete search history.

(56) References Cited

U.S. PATENT DOCUMENTS

| | | | |
|---|---|---|---|
| 2013/0238206 A1* | 9/2013 | Lemejda | B60T 8/1706 701/70 |
| 2013/0282253 A1* | 10/2013 | Ono | B60T 8/1706 701/72 |
| 2015/0057904 A1* | 2/2015 | Nishimura | B60T 8/1706 701/70 |
| 2015/0127240 A1* | 5/2015 | Nozawa | B60K 28/02 701/82 |
| 2016/0061132 A1* | 3/2016 | Hieda | B60K 31/0083 701/110 |
| 2017/0089939 A1* | 3/2017 | Azuma | G01C 1/00 |

FOREIGN PATENT DOCUMENTS

| | | |
|---|---|---|
| DE | 102011076640 A1 | 3/2012 |
| EP | 2641819 A1 | 9/2013 |
| JP | H02216355 A | 8/1990 |
| JP | H05208635 A | 8/1993 |
| JP | H08156539 A | 6/1996 |
| JP | 2004155404 A | 6/2004 |
| JP | 2009008614 A | 1/2009 |
| JP | 2015133397 A | 7/2015 |

OTHER PUBLICATIONS

Defintion of "motorcycle", Merriam-Webster Online Dictionary, publication date unknown, retrieved Dec. 11, 2018 at https://www.merriam-webster.com/dictionary/motorcycle (Year: 2018).*

International Search Report dated Mar. 29, 2016, of the corresponding International Application PCT/EP2016/050810 filed Jan. 15, 2016.

* cited by examiner

METHOD FOR DETERMINING THE LEAN ANGLE OF A TWO-WHEELER

FIELD

The present invention relates to a method for determining the lean angle of a two-wheeler.

BACKGROUND INFORMATION

When the brake is applied to the front wheel of a motorcycle while negotiating a curve, this results in a steering disturbance torque around the steering axis of the motorcycle, thereby uprighting the motorcycle, as a result of which it is forced into a larger curve radius. The steering disturbance torque is caused by the inclined position of the motorcycle and the tire contact point migrating to the side of the tire and the brake force acting on the tire contact point. With increasing inclination, the size of the disturbing force lever arm is increased, and consequently the torque which uprights the motorcycle.

In order to increase the driving safety during the brake application, it is known from DE 10 2011 076 640 A1 to distribute the wheel braking torque required by the driver automatically between the front wheel and the rear wheel when negotiating a curve. As a result, oppositely directed steering disturbance torques on the front and rear wheel, which at least partially compensate one another, may be generated while the overall braking torque is unchanged. The prerequisite, however, is the knowledge of the lean angle which is measured in DE 10 2011 076 640 A1 with the aid of a lean angle sensor in the motorcycle.

SUMMARY

An object of the present invention is to determine the lean angle in a two-wheeler with high accuracy using simple measures.

According to the present invention, this objective is achieved in accordance with the present invention. Advantageous refinements of the present invention are described herein.

An example method according to the present invention may be used in two-wheelers, in particular motorized two-wheelers such as motorcycles, motor scooters or the like, but also in bicycles with or without an electric motor drive, and is used for determining the lean angle, in particular when the two-wheeler negotiates curves. Based on the ascertained lean angle, different functions or functionalities may preferably be carried out automatically in the vehicle, which directly or indirectly result in improving driving safety. For example, it is possible, as a function of the lean angle, to automatically modulate the brake pressure on the front wheel and/or on the rear wheel brake of the two-wheeler in order to reduce steering disturbance torques in the two-wheeler or to minimize the effect of steering disturbance torques.

In the example method according to the present invention, the lean angle is calculated as a function of the axle load on at least one wheel of the two-wheeler. Initially, the axle load on at least one wheel is ascertained in a first step, and the lean angle is subsequently calculated as a function of the axle load in a second step. The axle load may be ascertained in a simple and precise manner, in particular, using a sensor system, for example, with the aid of a sensor which is situated between a fork accommodating the vehicle wheel and the wheel axle of the wheel. The axle load is a force which, as the result of centrifugal force and weight, is effective in the wheel plane and is inclined about the lean angle in relation to the vertical axis which is directed parallel to the weight vector. The axle load is preferably ascertained directly by a sensor system; however, an indirect determination of the axle load from additional state variables of the two-wheeler, which in turn are determined by a sensor system, may also be considered. With the aid of the axle load information, additional different functions or functionalities may preferably be carried out automatically in the vehicle, which directly or indirectly result in improving the driving safety.

When ascertaining the lean angle, an inclination angle and a correction angle may be considered, which, added together, yield the lean angle. The inclination angle is determined from the axle load and the correction angle depends on the tire width, since the tire contact point does not lie in the tire center but instead in the tire side area when negotiating a curve. The inclination angle is directly dependent on the axle load and also on the instantaneous speed of the two-wheeler as well as on the curve radius, the speed of the two-wheeler being preferably determined from wheel speed sensors and the curve radius being ascertained from an estimate, for example, as a function of the instantaneous steering angle.

The axle load is ascertained on at least one wheel of the two-wheeler and used as a basis for the calculation of the lean angle. In a preferred embodiment, the axle load is ascertained at least on the front wheel, an exclusive ascertainment of the axle load on the rear wheel in principle also being considered for calculating the lean angle. According to a preferred embodiment, however, the axle load is ascertained on both the front wheel and on the rear wheel and is used for calculating the lean angle.

From the axle load measurement, negotiating a curve may be distinguished from straight-ahead driving, since the axle load is higher when negotiating a curve. The lean angle may be used in a vehicle power unit, in particular in the braking system, in order, for example, to automatically adjust the brake pressure on the front wheel and/or on the rear wheel in connection with a brake regulation in such a way that driving stability is increased. An anti-lock braking system ABS may in particular be considered as a brake regulation system.

The lean angle ascertained from the axle load represents an independent estimated variable which, if necessary, may also be used as a correction or plausibility check variable for other estimation or calculation values.

Generally, knowledge of the lean angle makes it possible to detect slipping of the front and rear wheel at an early stage and to initiate appropriate measures for avoiding an accident or mitigating the consequences of an accident. In addition to the aforementioned interventions in the braking system, for example, a traction control may also be carried out by an engine intervention. It is also possible to detect an incipient accident due to the slipping of a wheel and, for example, to automatically initiate an emergency call (eCall), or, for example, to inform or warn other road users.

Load-dependent regulation strategies, in particular with regard to the brake regulation and/or the traction control, may be carried out via the ascertainment of the axle load. It is consequently possible, for example, to adjust and carry out regulating strategies in the case of travel with and without a pillion rider, depending on the total weight and, if necessary, the weight distribution on the motorcycle.

Ascertaining the axle load also makes it possible to detect whether the permissible total weight of the motorcycle is possibly exceeded, which may be indicated by a warning message. According to another advantageous embodiment, the motorcycle may be prevented from driving away if the permissible total weight is exceeded (interlock function).

It is furthermore possible to differentiate dynamic axle loads from static axle loads, in particular when the two-wheeler is started and/or stopped, and to use them for a starting or braking aid during start-up or braking.

Knowledge of the axle load may also be used in the case of a collision. Due to the sudden change in the axle load during a collision, passive safety systems may be triggered, if necessary. Moreover, different types of collision may be differentiated, if necessary, which accordingly result in different output signals.

The axle load may also be used, if necessary, for ascertaining the tire pressure on the front and/or rear wheel. A tire pressure check may also be implemented in this way. In particular, dynamic axle loads are used here, preferably in the case of straight-ahead driving, different tire pressures resulting in an axle load of varying dynamics due to the inertia of the two-wheeler as well as the wheels.

According to another advantageous embodiment, the axle load is determined on both the left and on the right side of a wheel.

The wheel is held and guided by a suspension fork, which in each case has a sensor for ascertaining the axle load in the left and right fork areas. The sensor is located, in particular, between the wheel axle of the wheel and the left or right suspension fork side. However, embodiments having only one sensor on one wheel side may also be considered.

The method steps for ascertaining the lean angle as a function of the axle load are carried out in a regulating or control unit in the two-wheeler. The two-wheeler is equipped with a sensor system which makes it possible to ascertain the axle load. Furthermore, additional sensors may be included, in particular wheel speed sensors, a steering angle sensor, a yaw rate sensor, and, if necessary, various acceleration sensors for ascertaining the longitudinal, transverse and/or vertical dynamics.

Additional advantages and advantageous embodiments may be derived from the description herein.

DETAILED DESCRIPTION OF EXAMPLE EMBODIMENTS

Figure 1:
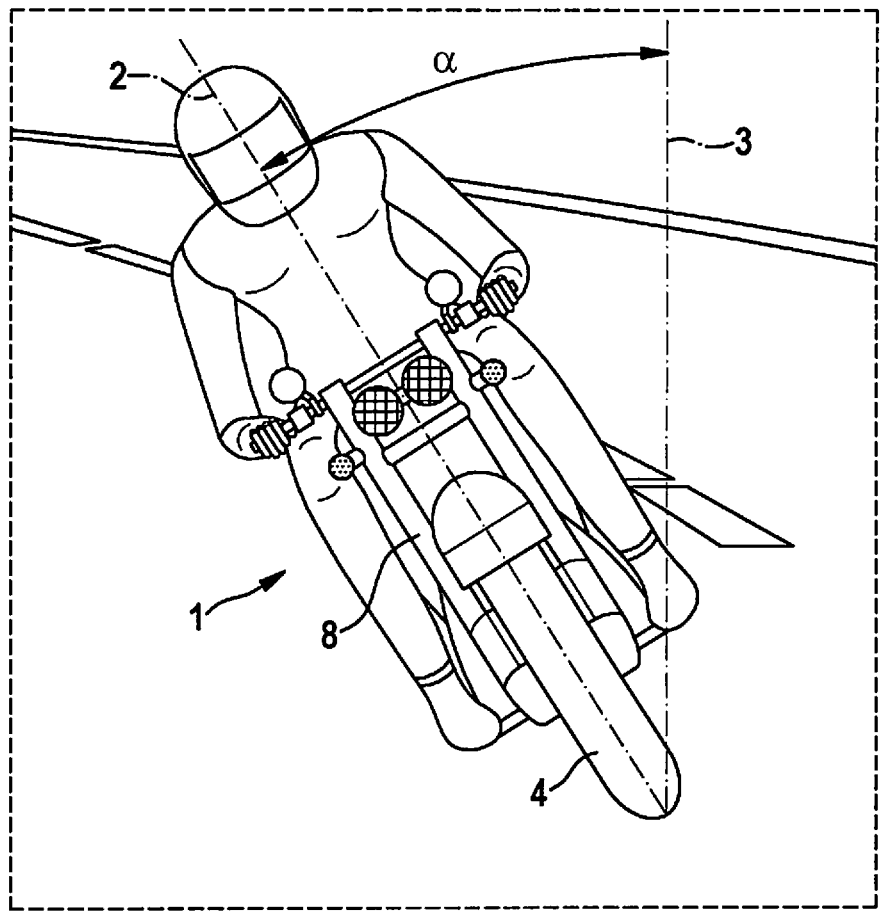
FIG. 1 shows a motorcycle in inclined position when negotiating a curve.

FIG. 1 shows a motorcycle 1 negotiating a curve. Motorcycle 1 is in an inclined position; inclination angle α denotes the angular position between a vehicle center plane 2 and a vertical 3. When motorcycle 1 is in an upright position, vehicle center plane 2 lies in vertical 3.

Figure 2:
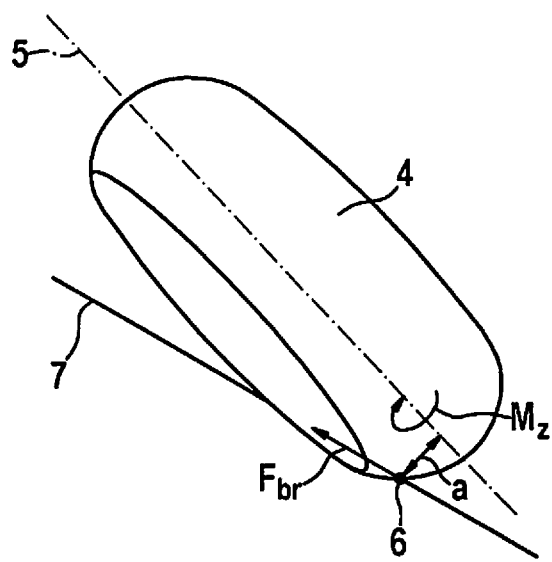
FIG. 2 shows the forces and torques acting on the front wheel in the case of an inclined position in the curve and a simultaneously effective brake force.

FIG. 2 shows front wheel 4 in a separate view in an inclined position. Due to the inclined position, tire contact point 6 of tire 4 migrates on roadway 7 from the tire center, through which steering axis 5 passes, to the side of the tire. Tire contact point 6 has distance a to the tire center, the distance forming the disturbing force lever arm. If front wheel 4 is braked, braking force $F_{br}$ acts on tire contact point 6, which together with disturbing force lever arm a results in a steering disturbance torque $M_z$ of the vertical or steering axis, the steering disturbance torque seeking to upright the motorcycle.

Lean angle φ represents a driving state variable which is relevant to the vehicle dynamics and which may be used in one or multiple power units or vehicle systems of the motorcycle, in particular in the braking system, in order to automatically adjust the brake pressure and thereby increase the driving safety. Lean angle φ is ascertained according to $$\varphi = \alpha + \gamma$$

from the sum of inclination angle α, which denotes the angular position between vehicle center plane 2 and vertical 3, and a correction angle γ, which results from the lateral displacement of tire contact point 6 from vehicle center plane 2 to the inside of the curve (displacement a in FIG. 2). Inclination angle α may be ascertained according to $$\alpha = \arcsin\left[\frac{F_R}{\sqrt{\frac{m^2 v^2}{r^2} + m^2 g^2}}\right] + \tan\left(\frac{-v^2}{rg}\right)$$

as a function of total mass m of the motorcycle including the driver and, if necessary, a pillion passenger, curve radius r, motorcycle speed v, gravitational acceleration g and axle load $F_R$ The calculation rule for inclination angle α may, if necessary, be represented as a power series expansion in the regulating or control unit.

Curve radius r may be determined approximately, for example, from the steering angle. In addition or alternatively, it is possible to use map or navigation-based information for ascertaining curve radius r.

Figure 3:
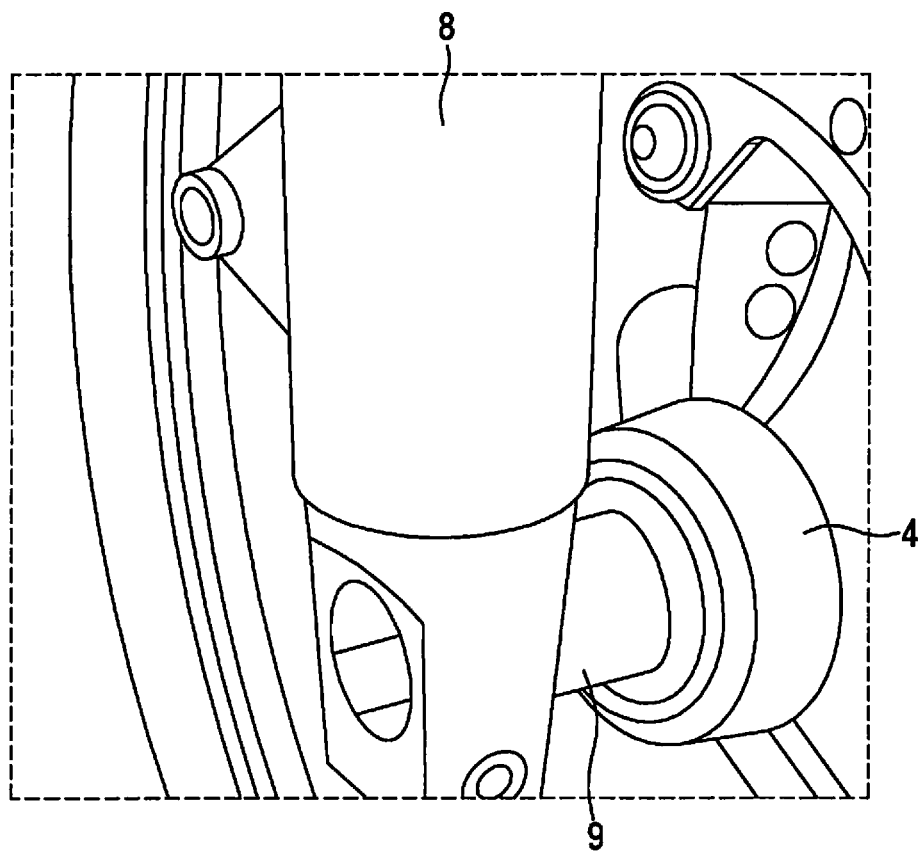
FIG. 3 shows a front wheel including the suspension on the suspension fork via a bolt including an integrated force sensor.
Figure 4:
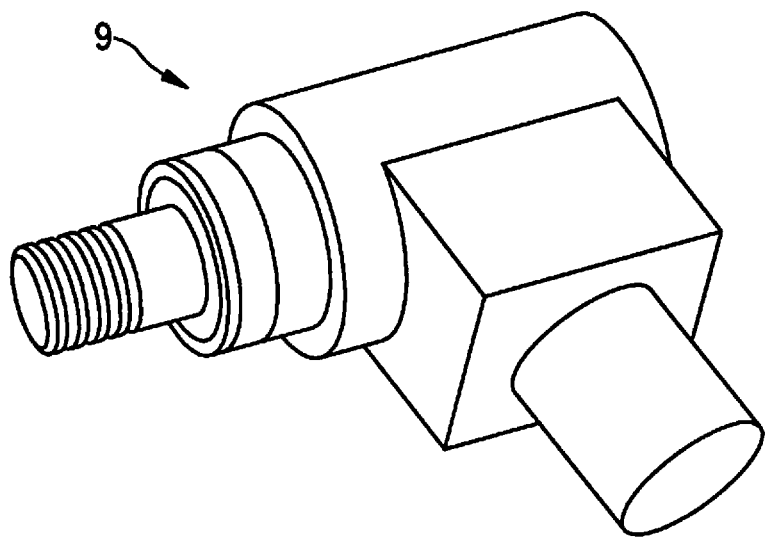
FIG. 4 shows the bolt including an integrated force sensor in a separate view.

Axle load $F_R$ may be determined with the aid of a sensor system. As is apparent from FIG. 3 in conjunction with FIG. 4, the wheel axle of front wheel 4 is coupled via an axle bolt 9 to a suspension fork 8 on the front wheel of the motorcycle, axle bolt 9 (iBolt) including a force sensor which is suitable for measuring axle load $F_R$ acting in vehicle center plane 2. Preferably, an appropriate axle bolt 9 including an integrated force sensor is located on both the left and right suspension fork areas, so that the axle load may be measured on both sides of suspension fork 8. Furthermore, it may also be advantageous to provide an appropriate sensor system on the rear wheel for ascertaining the axle load on the rear wheel, in particular both in the left and right rear wheel areas.

What is claimed is:
1. A method, comprising:
   ascertaining an axle load on at least one wheel of a two-wheeler;
   calculating a lean angle as a function of the axle load; and
   modulating a brake pressure on at least one of a front wheel brake and a rear wheel brake of the two-wheeler as a function of the calculated lean angle.
2. The method as recited in claim 1, wherein the axle load is ascertained at least on a front wheel and is the basis for calculating the lean angle.
3. The method as recited in claim 2, wherein the axle load is ascertained both on the front wheel and on a rear wheel.

4. The method as recited in claim 1, wherein the axle load is ascertained on both a left side and a right side of the wheel.

5. The method as recited in claim 1, wherein a tire pressure on a front wheel and a rear wheel is determined as a function of the axle load.

6. The method as recited in claim 5, wherein a tire pressure check is carried out as a function of the axle load and when the two-wheeler is driven straight ahead.

7. The method as recited in claim 1, wherein, as a function of the axle load, a starting torque and a braking torque is modulated during starting or stopping.

8. The method as recited in claim 1, wherein a vehicle accident system is set in the two-wheeler as a function of the axle load in the case of a vehicle accident.

9. The method as recited in claim 1, wherein an inclination angle is determined as a function of the axle load, and the lean angle is ascertained by adding the inclination angle and a correction angle dependent on a tire width.

10. A regulating or control unit, the regulating or control unit designed to:
   ascertain an axle load on at least one wheel of a two-wheeler; and
   calculate a lean angle as a function of the axle load; and
   modulate a brake pressure on at least one of a front wheel brake and a rear wheel brake of the two-wheeler as a function of the calculated lean angle.

11. A two-wheeler, comprising:
   a regulating or control unit designed to determine a lean angle of a two-wheeler, the regulating or control unit designed to ascertain an axle load on at least one wheel of the two-wheeler, calculate the lean angle as a function of the axle load, and modulate a brake pressure on at least one of a front wheel brake and a rear wheel brake of the two-wheeler as a function of the calculated lean angle; and
   a sensor system for ascertaining the axle load on the at least one wheel.

12. The two-wheeler as recited in claim 11, wherein the sensor system includes, on at least one axle, two sensors on a left and a right of the wheel.

13. The two-wheeler as recited in claim 11, wherein the sensor system includes at least one sensor between a wheel axle and a suspension fork which accommodates the vehicle wheel.

* * * * *